Oct. 23, 1945.  L. A. BIERLY  2,387,637
ANTI-ICING DEVICE FOR AIRCRAFT
Filed Dec. 17, 1942  2 Sheets-Sheet 1
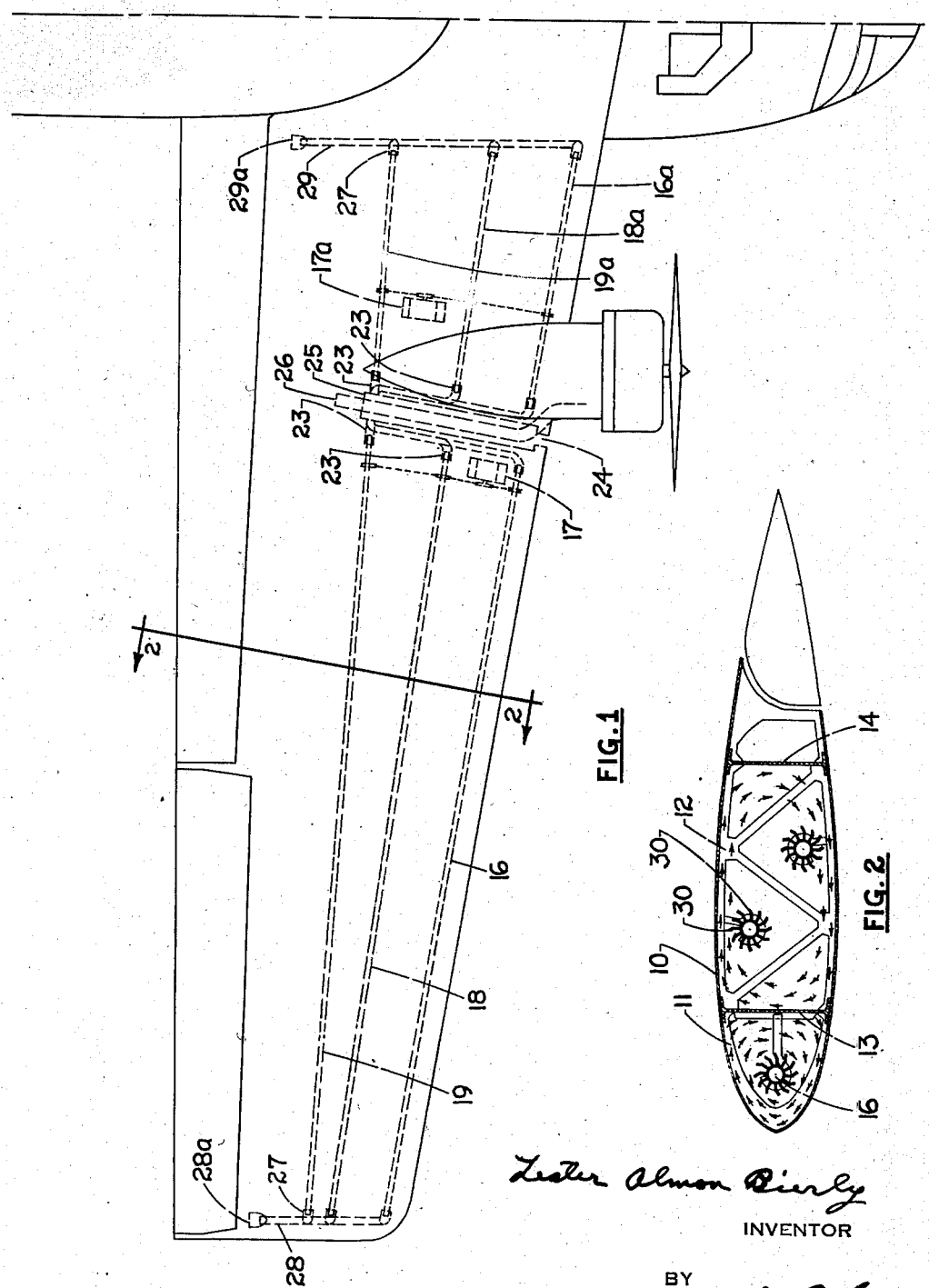

Oct. 23, 1945.   L. A. BIERLY   2,387,637
ANTI-ICING DEVICE FOR AIRCRAFT
Filed Dec. 17, 1942   2 Sheets-Sheet 2

Lester Almon Bierly
INVENTOR
BY
Willard D. Eakin
ATTORNEY

Patented Oct. 23, 1945

2,387,637

UNITED STATES PATENT OFFICE 2,387,637

ANTI-ICING DEVICE FOR AIRCRAFT

Lester Almon Bierly, Massillon, Ohio

Application December 17, 1942, Serial No. 469,303

5 Claims. (Cl. 244—134)

This invention relates to devices for preventing accumulation of ice on parts of aircraft.

Such "icing-up" of the wings or other lifting or control surfaces of an airplane, for example, not only increases the weight that must be supported but also changes the effective contours of the airfoils and thus lessens their aerodynamic efficiency.

Devices heretofore have been employed for breaking up and dislodging the ice after it has formed on the surfaces, but such devices in themselves add substantially to the weight of the craft and also change unfavorably the effective contours of the surfaces.

Also various devices have been proposed for maintaining the surfaces at a temperature such as to prevent the freezing of ice or the collection of sleet upon them, but all of them, so far as I am aware, have had definite draw-backs.

The use of motor-exhaust gases directly in contact with structural parts is to be avoided not only because of its local over-heating of parts, which greatly reduces the structural strength of aluminum alloys, for example, and is likely to cause warping or failure of parts, but also because of the corrosive effects of the gases.

It has been proposed to employ, as a heat-transfer medium, fresh air forced through the heating system by the impact of the slip-stream of the airplane, or preferably that of its propeller, on the principle of the Pitot tube, with the assistance of a suction grommet through which the air, after giving up heat to the surfaces to be protected, is discharged into the atmosphere, preferably at a relatively low-pressure part of the airfoil surface.

However, it has been found necessary, at excessive expense, and with excessive addition of weight, to provide a very rapid flow of heated air in contact with the inner surface of the shell or skin of an airplane wing, for example, to avoid the insulating effect of stagnant air and to provide adequate replenishment of heat being removed from the outer surface of the wing by the wiping or "scrubbing" effect of the slip-stream, containing, as it does, moisture having a high heat-absorbing capacity.

The chief objects of my invention are to provide inexpensively for the necessarily moderate and uniform application of heat to the part required to be protected from ice formation; to make such provision without objectionably adding to the weight of the craft; to avoid local or general overheating of parts; and to avoid the above mentioned and other disadvantages of devices of the prior art.

An airplane wing is chosen for purposes of illustration, but not of limitation, in the accompanying drawings, in which:

Fig. 1 is a plan view of an airplane wing assembly equipped with an anti-icing device embodying my invention in its preferred form.

Fig. 2 is a section on line 2—2 of Fig. 1.

Figure 3:
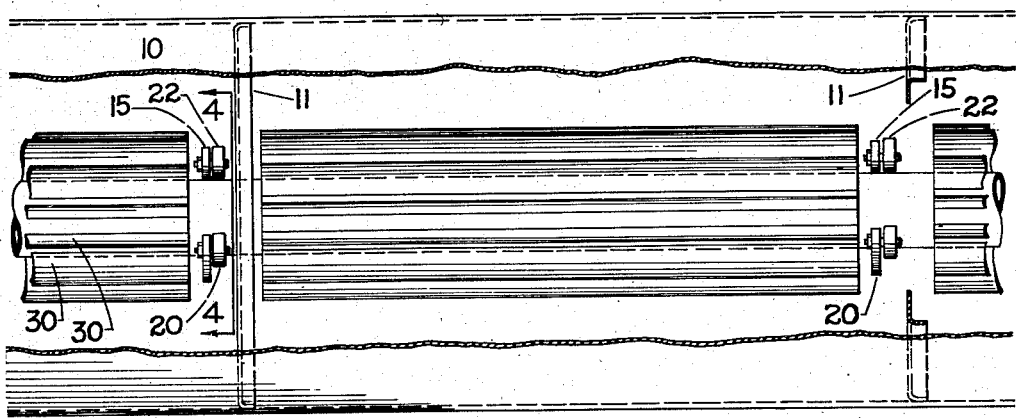
Fig. 3 is a fragmentary front elevation of parts of the wing, the skin of the wing being broken away and one of its ribs sectioned to show parts within the wing in elevation.
Figure 4:
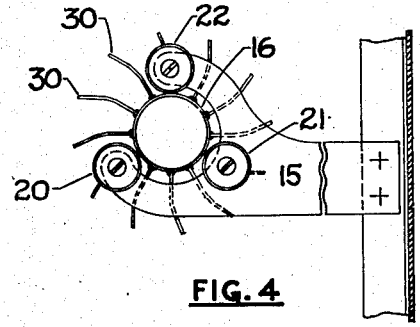
Fig. 4 is a section on line 4—4 of Fig. 3.

Referring to the drawings, which show the device applied to an airplane wing, although the invention is not limited to airfoils or to airplanes, the skin 10 of the wing, usually although not necessarily of an aluminum alloy, is provided with the usual internal rib-sections 11, 11 in the nose of the wing, and rib-sections such as that designated 12 in Fig. 2 in the middle section of the wing, these sections being secured to the usual front and rear wing spars 13, 14 which, with the skin of the wing, define an at least substantially closed chamber in the front part of the wing and another in the middle part of the wing.

The ribs here shown are of a standard type and without modification provide space for the mounting of devices hereinafter described, which is an advantage in the employment of the invention, but the invention is not limited to any particular type of rib.

Journaled upon forked brackets 15, 15 projecting from the framing, in the forward compartment of the wing, is a hot-air pipe 16 adapted to be rotated, through suitable drive connections, by a motor 17 (Fig. 1). Because of the location of the motor in the airplane chosen for illustration, a similar hot-air pipe 16a, similarly journaled and adapted to be driven by a motor 17a, is shown for taking care of part of the wing extending from adjacent the motor exhaust to the fuselage of the airplane.

Similar hot-air pipes 18, 19, 18a and 19a, similarly mounted and likewise driven by the motors, are shown in the middle compartment of the wing, which needs to be moderately heated to prevent it from icing up, even though the front third of the wing is more subject to ice accumulation than the rest of the wing.

For convenience of mounting the hot-air pipes are shown as journaled in sets of cradle rollers each comprising rollers such as are shown at 20, 21, 22, which are mounted, with suitable antifriction bearings, upon the brackets 15.

The several hot-air pipes are adapted to receive, through rotary-seal connections as at 23, 23, air driven into the system by impact at the mouth 24 of a heater jacket 25 surrounding the exhaust pipe 26 of the motor, and to conduct it, through rotary-seal connections as at 27, 27, to discharge pipes 28, 29 which are open to the atmosphere, through suction grommets 28ª, 29ª, on the rear part of the lower face of the wing.

Thus provision is made for rapid flow of hot-air through all of the pipes.

For transferring heat from such air to the skin of the wing the imprisoned air within the wing is used as a medium, at a lower temperature than that of the air in the pipes.

For the double function of effectively circulating the imprisoned air, to avoid the insulating effect of stagnant air and to provide the heat-replenishing wiping or scrubbing effect of air in contact with the inner surface of the wing shell, and of providing effective transfer of heat from the rotating pipes to the imprisoned air, each of the rotating pipes has secured on its outer surface, as by welding, between its bearings, a circumferential series of longitudinally disposed webs or fins 30, 30, which provide a large amount of metal radiating surface and also act as agitating or centrifugal-blower blades.

Preferably, although not necessarily, their radially outer portions are curved backward with relation to the direction of rotation (indicated by the numerous arrows) and preferably, although not necessarily, they extend directly lengthwise of the pipes when no need is apparent for circulation of imprisoned air lengthwise of the wing.

Suitable manual or thermostatic controls (not shown) preferably are provided for controlling the motors and permissibly also the several flow passages.

The mode of operation of the device will be manifest from the foregoing description.

Various modifications are possible without sacrifice of all of the advantages set out in the above statement of objects and without departure from the scope of the appended claims.

I claim:

1. A device for preventing accumulation of ice upon a hollow aircraft part, said device comprising a pipe rotatably mounted within the part, air-impelling means mounted on the exterior of the pipe in heat-conductive relation thereto, and means for internally heating and for rotating the pipe.

2. A device for preventing accumulation of ice upon a hollow aircraft airfoil, said device comprising an elongated member mounted within the airfoil for rotation on its longitudinal axis, said member axially extending substantially throughout the length of the airfoil, air-impeller means mounted on said member in heat conductive relation thereto, and means for rotating and for heating said member.

3. A device for preventing accumulation of ice upon a hollow aircraft part, said device comprising a pipe rotatably mounted within the part, air-impelling means mounted on the exterior of the pipe in heat-conductive relation thereto, means for supplying a heated fluid to the interior of the pipe, and means for rotating the pipe.

4. A device for preventing accumulation of ice upon a hollow aircraft part, said device comprising an elongated member mounted within the part for rotation on its longitudinal axis, air-impeller means mounted on said member in heat-conductive relation thereto, and means for rotating and for heating said member, the air-impeller means comprising a circumferential series of elongated fins disposed lengthwise of the member.

5. A device for preventing accumulation of ice upon a hollow aircraft part, said device comprising an elongated member mounted within the part for rotation on its longitudinal axis, air-impeller means mounted on said member in heat-conductive relation thereto, and means for rotating and for heating said member, the said member being journalled at a position between two units of the air-impeller means.

LESTER ALMON BIERLY.